United States Patent
Husseiny et al.

(10) Patent No.: US 9,387,941 B2
(45) Date of Patent: Jul. 12, 2016

(54) METHOD AND SYSTEM FOR DENYING SOARING AND MIGRATORY BIRDS ACCESS TO CRITICAL AREAS OF AIRPORTS AND AIRCRAFTS

(71) Applicants: TECHNOLOGY INTERNATIONAL INCORPORATED, LaPlace, LA (US); EMINENT TECHNOLOGY INCORPORATED, Tallahassee, FL (US)

(72) Inventors: Abdo Husseiny, LaPlace, LA (US); Omar Abdallah, Woodland Hills, CA (US); Bruce Thigpen, Tallahassee, FL (US); Ajay Mahajan, North Canton, OH (US); Jonathan Hagstrum, Menlo Park, CA (US); Zeinab A. Sabri, LaPlace, LA (US)

(73) Assignees: Technology International Incorporated, LaPlace, LA (US); Eminent Technology Incorporated, Tallahassee, FL (US)

( * ) Notice: Subject to any disclaimer, the term of this patent is extended or adjusted under 35 U.S.C. 154(b) by 0 days.

(21) Appl. No.: 14/266,545

(22) Filed: Apr. 30, 2014

(65) Prior Publication Data
US 2014/0374539 A1 Dec. 25, 2014

Related U.S. Application Data

(62) Division of application No. 12/942,578, filed on Nov. 9, 2010, now Pat. No. 8,813,438.

(51) Int. Cl.
*B64F 1/36* (2006.01)
*B64F 1/00* (2006.01)
*E01C 7/35* (2006.01)
*E01C 9/00* (2006.01)
*E01C 11/26* (2006.01)

(52) U.S. Cl.
CPC ... *B64F 1/36* (2013.01); *B64F 1/00* (2013.01); *E01C 7/351* (2013.01); *E01C 9/00* (2013.01); *E01C 11/26* (2013.01)

(58) Field of Classification Search
CPC ........ E02D 27/02; E02D 31/00; D02D 27/32; B64F 1/00; B64F 1/36
USPC .............. 52/169.1–169.3, 741.11; 244/114 R
See application file for complete search history.

(56) References Cited

U.S. PATENT DOCUMENTS

| | | |
|---|---|---|
| 1,152,426 A | 9/1915 | McCarroll |
| 1,760,386 A | 5/1930 | Vliet |

(Continued)

OTHER PUBLICATIONS

Scott, "Birds, Thermals & Soaring Flight", aerospaceweb.org, Dec. 4, 2005.

(Continued)

*Primary Examiner* — William Gilbert
(74) *Attorney, Agent, or Firm* — Studebaker & Brackett PC

(57) ABSTRACT

A method is provided for mitigation of aircraft bird strikes through the provision of conditions on the ground that totally prevents the formation of atmospheric thermals in the proximity of airports and airfields, whereby conflicts between soaring and migratory birds and aircrafts may be avoided. This is accomplished by modification of the topography of the field into a plurality of zones, as described herein and through construction of high albedo pavements, roads, artificial turfs and cool terrains.

14 Claims, 7 Drawing Sheets

(56) References Cited

U.S. PATENT DOCUMENTS

| | | |
|---|---|---|
| 2,170,914 A | 8/1939 | Rummler |
| 2,268,320 A | 12/1941 | Brandt |
| 2,329,220 A | 9/1943 | Rummler |
| 2,371,629 A | 3/1945 | Lee |
| 4,506,847 A | 3/1985 | Norman |
| 4,591,111 A | 5/1986 | Laughter |
| 5,170,965 A | 12/1992 | Yasuda |
| 6,012,675 A | 1/2000 | Cocatre-Zilgien |
| 6,089,506 A | 7/2000 | Scheffel |
| 7,198,427 B2 | 4/2007 | Carr et al. |
| 7,431,243 B1 | 10/2008 | Allen |

OTHER PUBLICATIONS

Shannon et al., "American White Pelican Soaring Flight times and Altitudes Relative to Charges in Thermal Depth and Intensity" The Condor 104, pp. 679-683, The Cooper Ornithological Society 2002.

Kelly, "Seasonal Variation in Birdstrike Rate for Two North American Raptors: Turkey Vulture (*Cathartes aura*) and Red-Tailed Hawk (*Buteo jamaicensis*)", J. Raptor Res. vol. 33(1), pp. 59-62, 1999 The Raptor Research Foundation, Inc.

Angevine et al., "The Flatland Boundary Layer Experiments" Bulletin of the American Meteorological Society, 1998.

METHOD AND SYSTEM FOR DENYING SOARING AND MIGRATORY BIRDS ACCESS TO CRITICAL AREAS OF AIRPORTS AND AIRCRAFTS

This invention was made with government support under Contract Number: FA9302-10-M-0011 awarded by The United States of America as represented by the Department of the Interior, Washington, DC. The government has certain rights in the invention.

TECHNICAL FIELD

The invention relates to a method for denying soaring and migratory birds access to critical areas of airports and aircrafts and paths of taking off and landing aircrafts. More particularly, the inventions provides a method of eliminating a potential formation of thermals or up-draughts essential for lifting soaring and migratory birds, thereby avoiding conflicts between taking off and landing aircrafts and soaring or migratory birds.

BACKGROUND

Bird strikes happen most often during takeoff or landing, or during low altitude flight of aircrafts. The majority of bird collisions occur near or on airports (90%, according to the International Civil Aviation Organization (ICAO)) during takeoff, landing and associated phases. According to the FAA Wildlife Hazard Management Manual (2005), less than 8% of strikes occur above 900 m (2,953 ft) and 61% occur at less than 30 m (100 ft). The point of impact is usually any forward-facing edge of the vehicle such as a wing leading edge, nose cone, jet engine cowling or engine inlet. For example, turkey vultures and red-tailed hawks account for the majority and more costly of damaging raptor strikes to USAF aircrafts, which amount to 31% and 32%, respectively. As of Jan. 1, 2008, turkey vultures were responsible for 798 bird strikes costing about 52 million dollars while the red-tailed hawks were responsible for 814 strikes with about 14.6 million dollars in damages. Both turkey vultures and red-tailed hawks showed a marked increase in the number of bird strikes during the summer. This was due to the relationship between thermal activity and strike rate for these two species. Both forage by soaring on thermals, without which they are unlikely to reach the height required to bring them into conflict with aircraft. Thermals are formed on dark earth, black tops, roadways, towns, urban areas plowed fields and exhaust gas from power plants in the presence of cumulus clouds. On the other hand, sun reflective surfaces, marshes, and white coated surfaces do not support thermals. The most pronounced damage was caused by the American white pelican reaching about 257.65 million dollars in spite of their low number of strikes. Other thermal soaring birds responsible for the top 50 USAF wildlife strikes include buzzards, eagles, kites, gulls, herons, pelicans and terns.

The typical lift-off speed for an F-15 fighter plane is 150 knots. A Boeing 747, for example, spends longer time in critical path. The aircraft acceleration during takeoff and landing hinders any birds' reaction to avoid collision. Reaction time of birds relative to the motion of the aircrafts is very important for survival of the birds and the avoidance of damage to the aircraft. Such reaction time for soaring birds will be much longer compared to free flying birds.

Accordingly, there is a need to eliminate soaring and migratory birds' conflicts with aircrafts. There is also a need to eliminate the formation of atmospheric thermal currents or thermals in the immediate vicinity of the airports and airfields proper and along the paths of taking off and landing of aircrafts. In addition, there is a need to provide high albedo surfaces in the airport including surfaces of the buildings, runways, roads and the surrounding terrain while preserving the aesthetics of the surfaces. Furthermore, there is a need to conserve/protect migratory birds and soaring birds by providing them with sanctuaries and/or habitat away from airways.

SUMMARY

The invention provides a method for creating a thermals-free zone that may include the expanse of airports and airfields proper and at the same time denying soaring and migratory birds' access to such zone.

According to one embodiment consistent with the claimed invention, a method is provided for denying soaring and migratory birds access to critical areas of airports and airfields and paths of taking off and landing aircrafts, comprising eliminating a potential formation of thermals or up-draughts essential for lifting soaring and migratory birds and dividing the critical areas of airports and airfields and paths of taking off and landing aircrafts into a plurality of zones.

In one aspect of the invention, the plurality of zones include an airport zone 1 or a thermals-free zone 1 that includes an airside area and a landside area of the airports and airfields and the paths of taking off and landing aircrafts; an unrestricted zone 3 of open and public spaces that are not under the control of operators of the airports and airfields; an exclusion zone 2 that separates the thermals-free zone 1 from the unrestricted zone 3; a green area zone 4 that provides protection, sanctuary and abundant food and water supply for the soaring and migratory birds; a bird sanctuary zone 5 for conservation and creation of a habitat for the soaring and migratory birds; and a water body zone 6 that is immune to the potential formation of thermals surrounding the thermals-free zone 1 from the unrestricted zone 3.

Still other aspects, features, and advantages of the present invention are readily apparent from the following detailed description, by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

DETAILED DESCRIPTION

Figure 1:
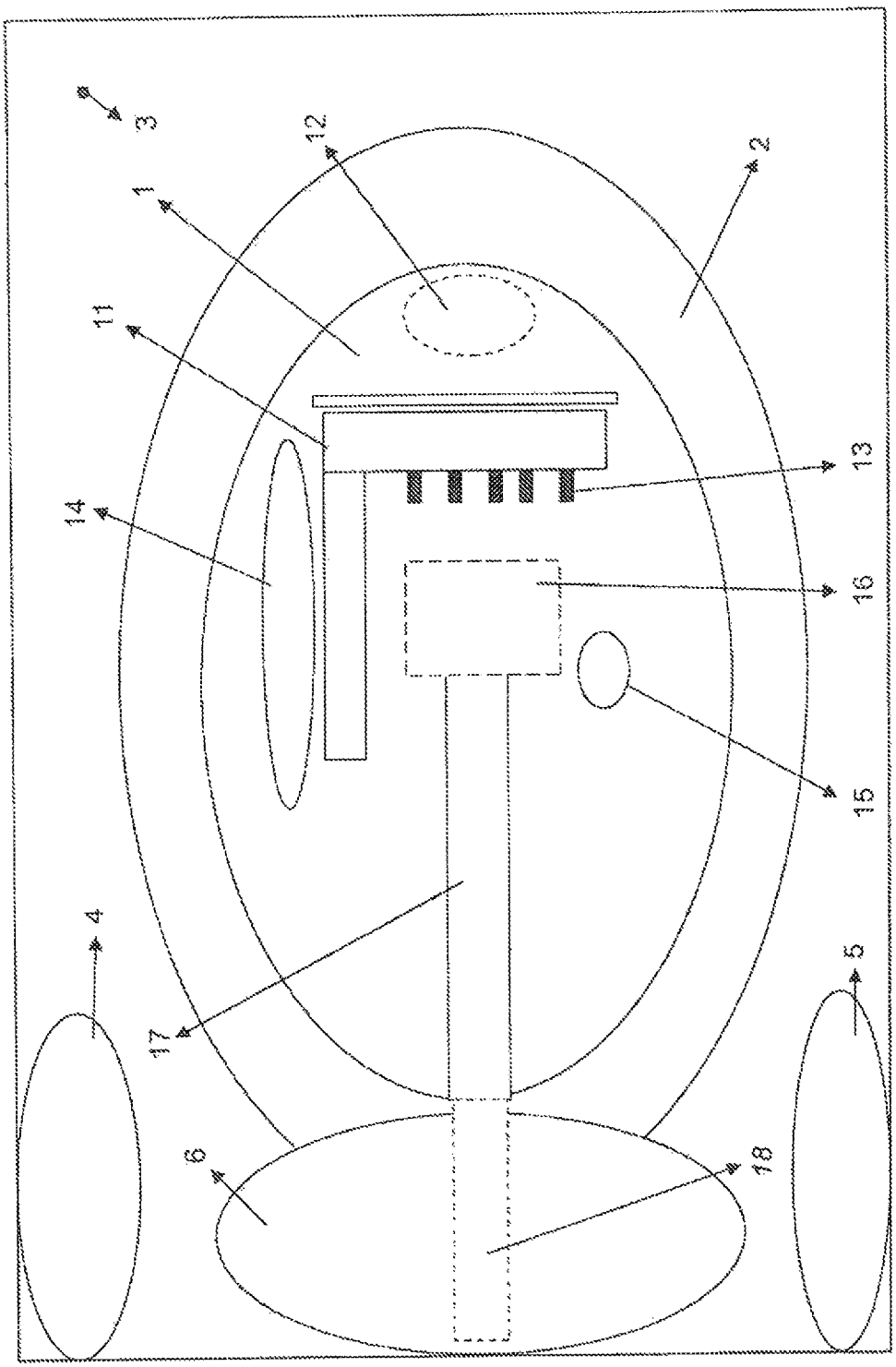
FIG. 1 is a top view of an overall layout of a sample airport that include an airport zone 1 or a thermals-free zone 1, an exclusion zone 2 and an unrestricted zone 3 (not drawn to scale)

The degree of solar heating of the ground depends on many factors, e.g. solar insolation in the area; color, mass and condition of the exposed surface; specific heat and thermal conductivity of the substance of the exposed surface, and location of the substance on the surface of the earth in relation to other nearby objects.

Surface color, as known in the law of physics, plays a very important role in the phenomena of radiant heat absorption and emission. Therefore, a white body surface can, under similar conditions, emit a lesser amount of sensible heat than a black body per unit surface.

In consistent with the features of the invention, it is desirable to have a cold body surface surrounded by a warmer body surface to mitigate the conditions that lead to the formation of thermal currents. By doing so, it allows for an exclusion distance (exclusion zone 2) that would avoid stray birds and, at the same time, accommodate planes that overshoot their planned flight path. Under these conditions, cool air from the cold area will not only continually flow over the hot area but will also be raised in temperature, expand, decrease in specific gravity, and eventually rise up. Based on the above, it becomes possible to provide migratory bird species and other birds with a non-restricted protected area (unrestricted zone 3) or a sanctuary (bird sanctuary zone 5) at a distance far enough from flight paths so that they can roost, nest, feed and forge freely while avoiding conflicts with arriving and departing aircrafts.

In the airport proper (thermals-free zone 1), the whole airside areas (including all areas accessible to aircrafts, e.g., runways, taxiways, ramps and tank farms) may be kept at a temperature close to that of the air temperature of a cold body or white body using passive means, e.g., high-albedo surface-coating and/or reflective materials. In areas where in the summer heat is excessive and characterized by higher insolation over extended periods, active means may be used, e.g., application of cooling water. Exposed surfaces of terminal buildings, hangers, cargo storages, service buildings and tank farms, etc., may be coated with white coating and/or reflective materials. Landside areas including parking lots, public transportation train stations (if any), and access roads may have at least off-white colors on their surfaces.

U.S. Pat. No. 7,198,427 to Carr et al. discloses a safety system for airports and airfields that includes (1) an aesthetically pleasing artificial turf that retards birds and other animals and (2) a sub-surface that supports the weight of an aircraft, enhances water drainage and enables the accessibility of airport vehicles to all parts of runway or taxiway, and methods for installing the safety system. However, the green color of the artificial turf according to Carr et al. supports thermal formations that attract gatherings of soaring birds having a free-lift to collide with planes at relatively low altitude.

In fact, work by others promoted the formation of artificial thermals in favor of facilitating the flights of sailplanes and gliders. For example, in U.S. Pat. No. 2,268,320, Brandt describes the production of atmospheric or thermal air currents in the immediate vicinity of the airport by heating large volumes of air either by solar or artificial means to provide up-draughts that are essential to soaring or gliding flights. In addition, U.S. Pat. No. 2,371,629 to Lee discloses a means for forming an artificial thermal or ascending warm air current for sail-plane soaring that can be actuated by solar radiation.

The method, in consistent with the features of the claimed invention, may provide an extension of the thermals-free zone 1 around the expanse of airports and airfields, which, in turn, allows ample distances for aircraft flight paths during aircraft take-offs and landings, without creating conflicts between any size aircrafts and soaring and migratory birds. It may also secure the thermals-free zone 1, particularly on the airsides of airports or airfields by active cooling the surfaces of the pavements of the airsides. It may also provide an exclusion area 2 of sufficient width around the thermals-free zone 1 for separating the zone from birds' habitats, sanctuaries and roosting areas, thereby preventing possible collision between stray soaring birds and aircrafts that divert from their flight paths. It may further provide a safe protected area for birds to roost, nest, feed and soar freely away from air traffic.

Hereinafter, the invention will be described more specifically by way of examples. It is to be noted, however, the invention is by no means limited to these examples.

EXAMPLES

As described in FIG. 1, there are a plurality of zones that can be contemplated in accordance with the features of the claimed invention. The plurality of zones include an airport area 1 or a thermals-free zone 1, an unrestricted zone 3, an exclusion zone 2 that separates thermals-free zone 1 from unrestricted zone 3; a green zone 4 that is located on the unrestricted zone 3 and includes grass, shrubs, trees, etc.; a bird sanctuary zone 5 that serves as a protected area for birds to nest, rest, roost and soar; a water body zone 6 such as a lake, man-made pond or alike along the runway may protect the aircrafts during takeoff from collisions with soaring birds at a relatively higher altitude. Although the sketch in FIG. 1 applies to one runway in a small airport, the principle may be applied to multi-runway airports.

Figure 2:
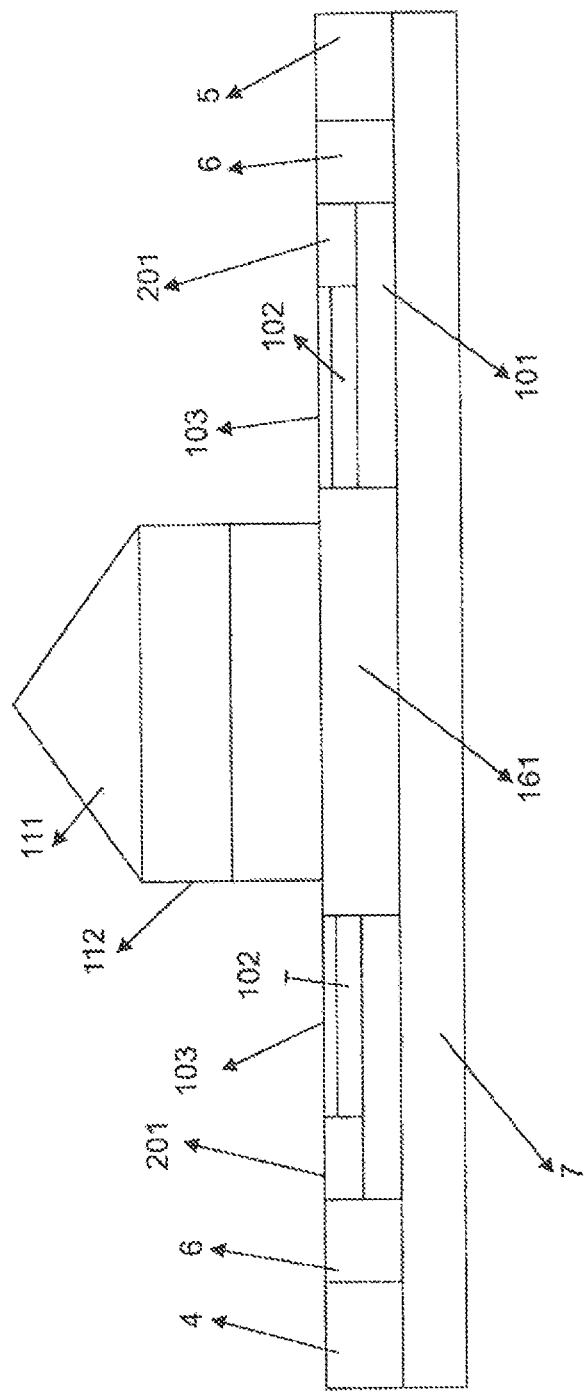
FIG. 2 shows a cross-section of the ground of the airside and landside areas of thermals-free zone 1, buildings, exclusion zone 2 and unrestricted zone 3 of the sample airport shown in FIG. 1.

As shown in FIG. 2, the exposed surfaces and sidings 112 of the control tower, terminal buildings 11, tarmacs 13, cargo 14, hangars and other structures, such as service buildings, may be made of reflective materials. The roofs 111 may be coated with special coating material, such as a mixture of various silica and ceramic beads immersed in a high quality latex base with acrylic binders; e.g., TEMP-COAT® (manufactured by SPAN-WORLD Distribution, LLC) and THERMAL-COAT™ (manufactured by Innovative Coating Solution, Inc.) and the like or better.

As illustrated in FIG. 2, the creation of cold or white body requires the use of high-albedo pavements constructed from white cement concrete 161. Accordingly, the airside areas of the airport area 1 or thermals-free zone 1, including taxiways 16, runways 17, tarmacs 13 and the ground around tank farms 15 may be paved with white cement concrete 161 directly over the earth surface 7 and may be surfaced with a white coating, e.g., white cement coating.

Also described in FIG. 2, the landside areas of the airport area 1 or thermals-free zone 1, including terminal 11, parking lots 12, cargo 14, public transportation train stations (if any), and access roads may be paved with an asphalt layer 101 with an upper layer 102 made of light-colored, non-heat absorptive material that acts as a thermal insulator. The material of upper layer 102 needs to be water-insoluble so that it will remain intact during wet seasons. Examples of the material for upper layer 102 may include aggregates (e.g., granite, limestone or water insoluble salts, such as chalk, crystallized gypsum, magnesium oxide, etc.). Additionally, the pavement may be surfaced with a top-coat 103 made up of mixed chippings of sand and oyster shells, etc., as shown in FIG. 2.

An artificial turf may also be constructed in the exclusion zone 2, in accordance with the disclosure of U.S. Pat. No. 7,198,427 to Carr et al., with the selection of a lighter color artificial turf instead. This is due to the ability of the artificial turf to discourage birds' presence. However, it is well-known fact that plowed fields and well groomed grass are good source of thermals. Accordingly, one embodiment of the invention, as shown in FIG. 2, is the use of an off-white color for top layer 201 in the exclusion zone 2. The top layer 201 is over the asphalt 101 and may be constructed from gravel mixed chippings of sand and oyster shells.

Figure 3:
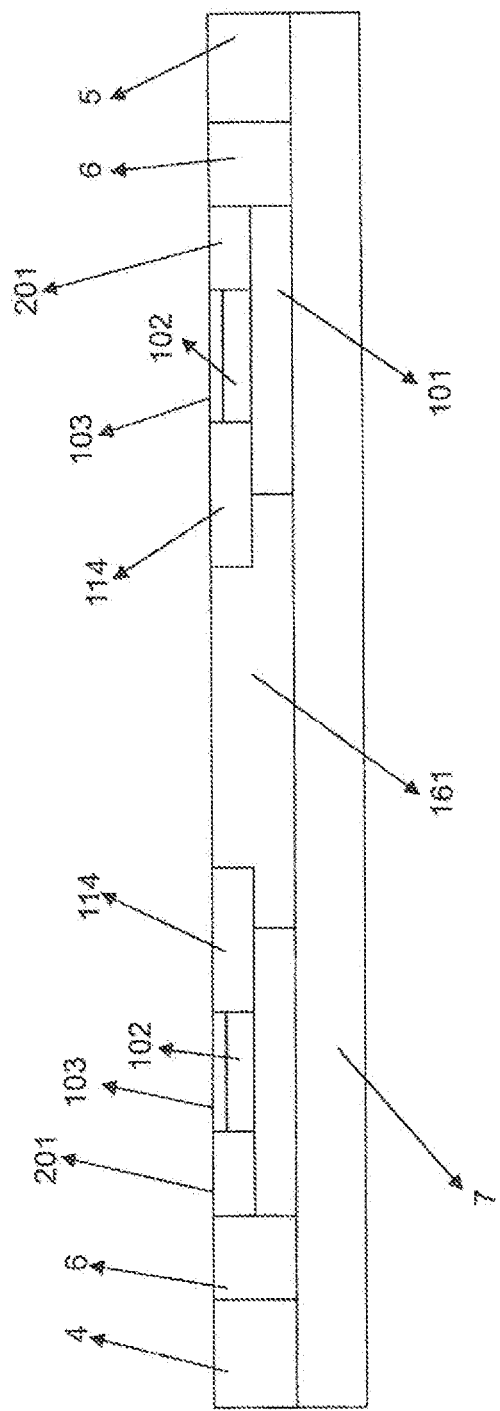
FIG. 3 illustrates the use of a gravel easement 114 on each side of the pavement of the airside and landside of thermals-free zone 1.

In FIG. 3, the white concrete pavement 161 of the airside of the airport area 1 or thermals-free zone 1, may have a first and a second gravel easements 114 on each side of the white concrete pavement 161. Each of the gravel easements 114 may extend to each side part of the layered pavement of the landside to replace the upper layer 102 and top-coat 103.

Figure 4:
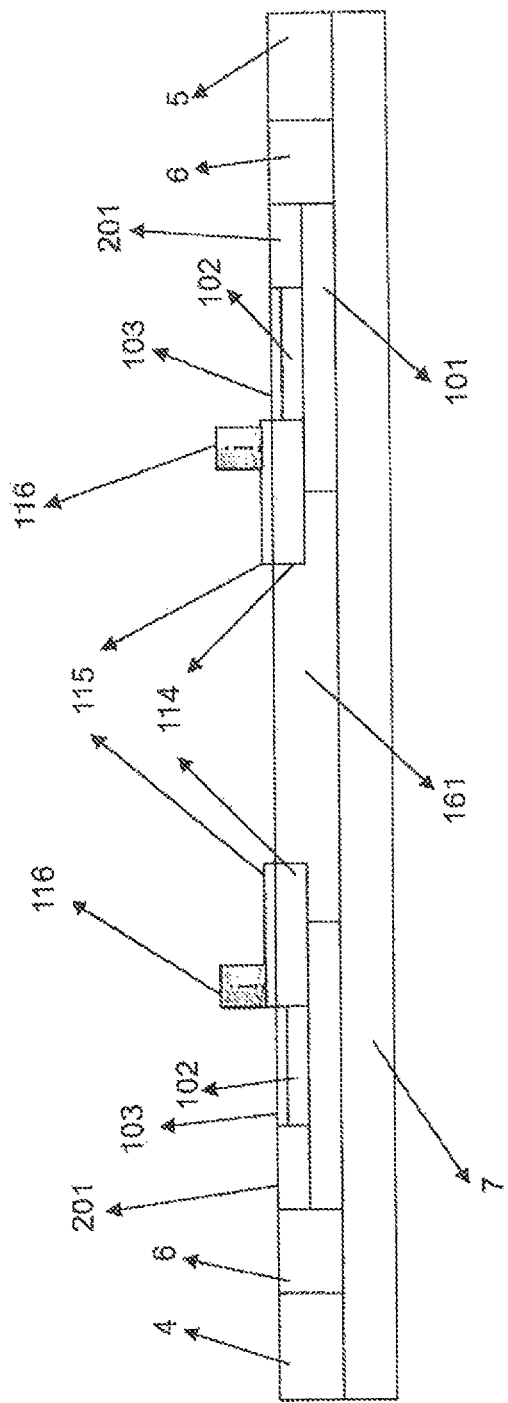
FIG. 4 illustrates the active cooling of each of the gravel easements 114 as depicted in FIG. 3.

The first and second gravel easements 114, may be further artificially cooled by formation of a thin water film 115. The thin water film 115 may be maintained during times of high insolation through a timed spray system 116, as shown in FIG. 4. The thin water film 115 can provide evaporative cooling to the gravel easement 114, which has a porous like structure.

Figure 5:
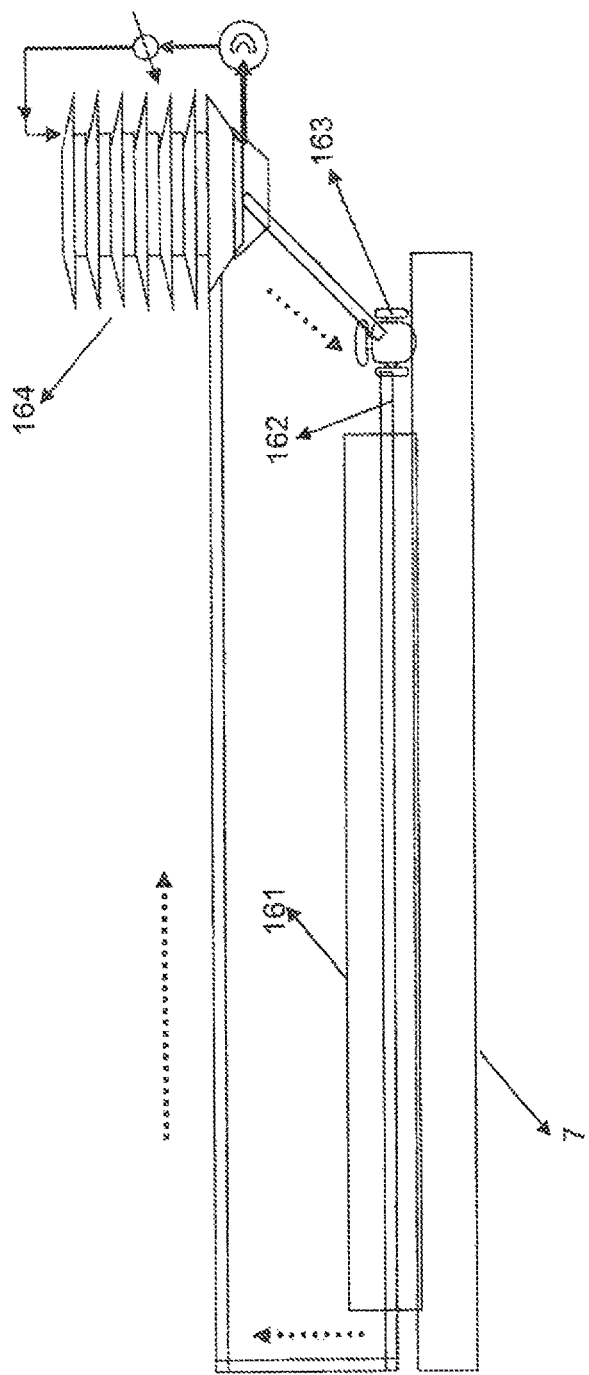
FIG. 5 illustrates the active cooling of the pavement of the airside of the thermals-free zone 1 using a plurality of water pipes 162.

As illustrated in FIG. 5, the white concrete pavement 161 of the airside of the airport area 1 or thermals-free zone 1 is actively cooled by means of a plurality of water pipes 162 that are embedded in the white concrete pavement 161. The plurality of water pipes 162 may be made of PVC or any other durable plastic material. Cooling water may be circulated through the plurality of water pipes 162 with the aid of a pumping station 163 to maintain water temperature and flow sufficient to provide a thermal equilibrium between the surface of the white concrete pavement 161 and ambient air. The benefit gained from this arrangement is that the plurality of water pipes 162 may be utilized for transporting warm water during winter season in cold regions to prevent the surface of the white concrete pavement 161 from freezing.

The layout and construction of the bird sanctuary zone 5 may enhance the formation of thermals to attract soaring birds, which sense the presence of thermals through the emitted infrared and infrasonic waves, as well as the associated humidity. The bird protected areas or bird sanctuary zone 5 may be constructed according to the disclosure of either U.S. Pat. No. 2,268,320 to Brandt or U.S. Pat. No. 2,371,629 to Lee or any of one of similar designs.

Figure 6:
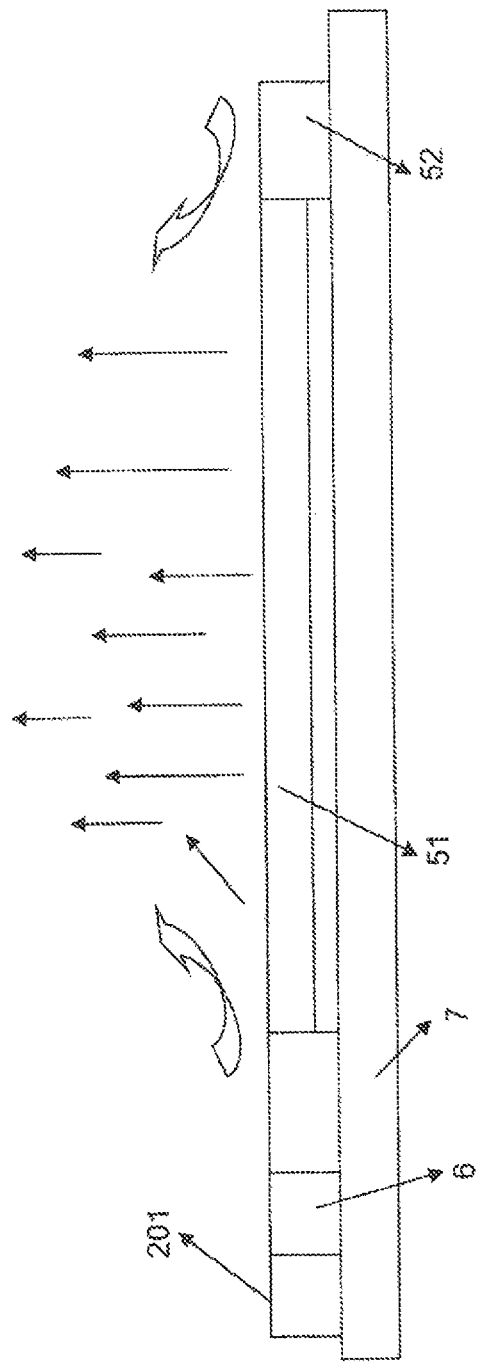
FIG. 6 illustrates the construction of a bird sanctuary zone 5.

An exemplary bird sanctuary zone 5, according to the features of the invention, is shown in FIG. 6. One side of the bird sanctuary zone 5 may include a water body zone 6 and a top layer 201 of the exclusion zone 2. The bird sanctuary zone 5 may include a dark-colored or black body 51 and a reflecting light colored or white surface 52, which rests on the earth surface 7 and extends underneath the dark-colored or black body 51. The dark-colored or black body 51 is formed from a porous heat absorptive material such as peat moss. The light colored or white surface 52 may be formed from sandy soil topped with oyster shells or similar heat reflective material of albedo significantly higher than that of the dark-colored or black body 51.

Through solar heating, the dark-colored or black body 51 absorbs heat and transfers the radiant heat to sensible heat, which, in turn, heats the air in contact with it by conduction means. At the same time, the light colored or white surface 52 reflect the solar radiant heat causing the temperature of the air in contact with the dark-colored or black body 51 to be raised, expanded and then risen to form a steady up-draught of air, as shown in FIG. 6.

Similarly, the green area zone 4 can be constructed from natural grass and shrubs to provide a habitat for birds where they can nest, feed and breed. Furthered by natural grass, birds and other animals, including gulls, waterfowl, raptors such as hawks and other species flock to airfields to eat, drink and reproduce. By doing so, they pose a potentially dangerous safety problem for departing and arriving aircrafts. Birds eat insects and grubs, which live in natural grass up to six inches (15 cm) below the soil surface. Birds also eat rodents that feed on the insects. Standing water, particularly after fresh rains, attracts many species of birds, including waterfowl. Large birds, such as ducks or geese, also create dangerous conditions for aircrafts (classified herein as foreign object damage (FOD)). Natural grass further provides material and cover for birds to nest and breed.

Figure 7:
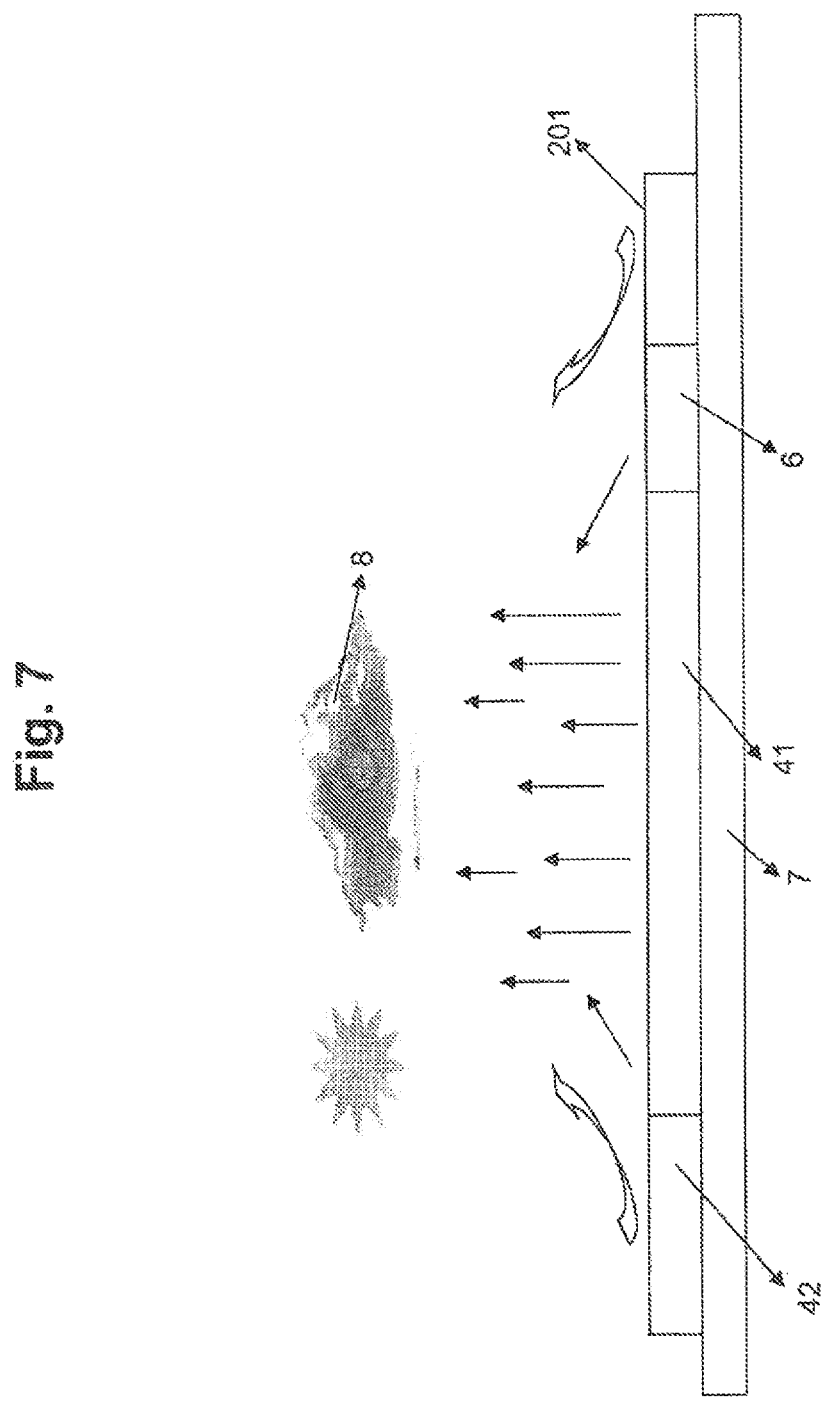
FIG. 7 illustrates the construction of a green zone 4 for soaring and migratory birds.

FIG. 7 shows the construction of the green zone 4. On one side of the bird sanctuary zone 5 are the water body 6 and the top layer 201 of the exclusion zone 2. The green zone 4 includes a tall grass area 41, which is in direct contact with the earth surface 7 and a reflecting light colored or white surface 42 that also rests on the earth surface 7. The tall grass area 41 may include natural grass, shrubs and may also contain drainage water or narrow streams of water. The white surface 42 may be formed from sandy soil topped with oyster shells or similar heat reflective material of albedo that is significantly higher than that of the tall grass area 41. This arrangement is conducive to the formation of up-draught particularly in the presence of cumulus clouds 8.

The invention disclosed herein may also be applied to military airfields, as well as civilian airports of any type or size.

In addition to attracting soaring birds (e.g., herring gull; great blue heron; ring-billed gull; Swainson's hawk; sharp-shinned hawk; laughing gull; Australian pelican; Franklin's gull; Caspian tern; common black-headed gull; other gulls, terns; hawks; eagles, kites (e.g. Mississippi kite and etc.)) to protected areas where thermals are likely to be formed, other factors such as the availability of food, water, safe locations for nests and rest may also attract other birds beside those mentioned above. Other birds may include the barn swallow/swallow; dark-eyed junco; mallard; American mourning dove; snow goose; horned lark; common/great northern loon/diver; killdeer; rock dove/pigeon; perching birds; common Turkey; lesser scaup; common starling; eastern meadow lark; American robin; double-crested cormorant; American cliff swallow; American kestrel; lark bunting; northern pintail/pintail; gadwall; common buzzard/buzzard; western meadowlark; chimney swift; yellow-rumped warbler; common wood-pigeon; kittiwakes; Mexican/Do.-Str. stone-curlew/thick-knee; sparrows; buntings; and finches. All of these bird species were responsible for the top 50 collisions with USAF aircrafts by First of January 2008. Hence, it is important to attract them away from the paths of aircrafts during taking off or landing. This is in addition to denying them access to critical areas of airports and aircrafts and paths of taking off and landing aircrafts.

Although a limited number of exemplary embodiments of the claimed inventions have been described above, it is to be understood that variations and modifications will be apparent to those skilled in the art without departing from the scope and spirit of the inventions. Therefore, the scope of the inventions is to be determined solely by the following claims and their equivalents.

What is claimed is:

1. A method for avoiding conflicts between taking off and landing aircrafts and soaring or migratory birds, said method comprising the steps of:
   dividing a critical area of an airport and an airfield into a plurality of zones which comprises
      a thermal-free zone that includes an airside, a landside area of the airport and the airfield, and paths of taking off and landing aircrafts;
      an unrestricted zone of open and public spaces that are not under the control of operators of the airport; and
      an exclusion zone that separates the thermals-free zone from the unrestricted zone; and
   paving the thermal-free zone with a white cement concrete to eliminate a potential formation of thermals or up-draughts
   wherein the elimination of thermals or up-draughts leads to an avoidance of the conflict between the taking off and landing aircrafts and the soaring and migratory birds.

2. The method of claim 1, wherein the plurality of zones further comprising:
   a green area zone;
   a bird sanctuary zone; and
   a water body zone.

3. The method of claim 2, wherein the exclusion zone is paved, and a pavement of the exclusion zone comprises:
   an asphalt bottom layer; and
   an off-white top layer.

4. The method of claim 2, wherein the bird sanctuary zone comprises:
   a dark colored or black body and
   a light colored or white surface, which rests on the earth surface and extends under the dark colored or black body.

5. The method of claim 4, wherein the light colored or white surface is formed from a heat reflective material of albedo that is significantly higher than that of the dark colored or black body.

6. The method of claim 2, wherein the green zone comprises:
   a tall grass area and
   a reflecting light colored or white surface, both of which rest on the earth surface.

7. The method of claim 1, wherein a pavement of the airside area of the thermals-free zone comprises:
   a high-albedo white cement concrete;
   a white cement coating; and
   a first and a second gravel easements on each side of the pavement.

8. The method of claim 7, wherein the first and the second gravel easements are artificially cooled by formation of a thin water film and maintained by a timed spray system.

9. The method of claim 7, wherein the pavement of the airside of the thermals-free zone is actively cooled by a plurality of water pipes that are embedded in the high-albedo white cement concrete.

10. The method of claim 9, wherein cooling water from the plurality of water pipes is circulated through a cooling water tower with the aid of a pumping station.

11. The method of claim 9, wherein the plurality of water pipes transport warm water during winter times to prevent freezing of a surface of the pavement of the airside of the thermals-free zone.

12. The method of claim 1, wherein a pavement of the landside area of the thermals-free zone comprises:
    an asphalt bottom layer;
    an upper layer and
    a top-coat layer.

13. The method of claim 12, wherein a pavement of the landside area of the thermals-free zone further comprises first and second gravel easements that extend to a side part of the layered pavement of the landside area to replace the upper layer and the top-coat layer.

14. The method of claim 1, wherein an exposed surface of a structure constructed on the thermals-free zone, comprises a roof and a siding, both of which are covered with a coating material for reflecting sun rays.

* * * * *